A. T. ADAMS.
ELEVATOR.
APPLICATION FILED AUG. 16, 1910.
1,163,057.
Patented Dec. 7, 1915.
2 SHEETS—SHEET 1.
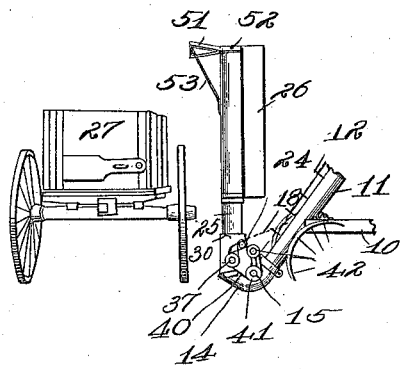
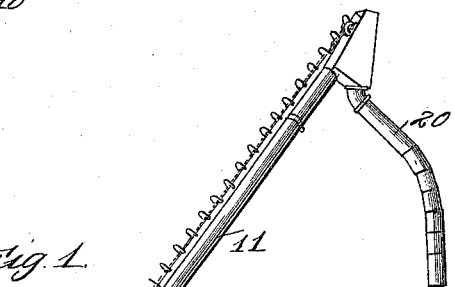
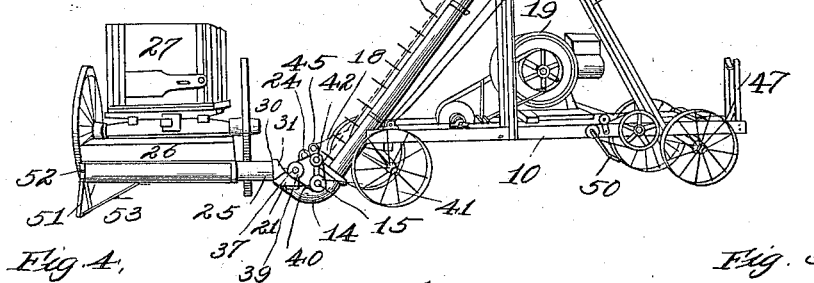
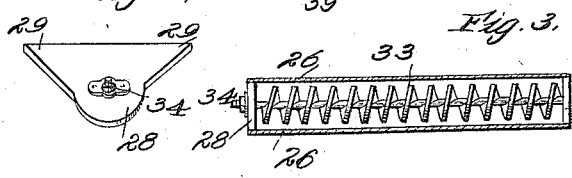
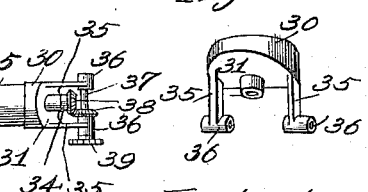

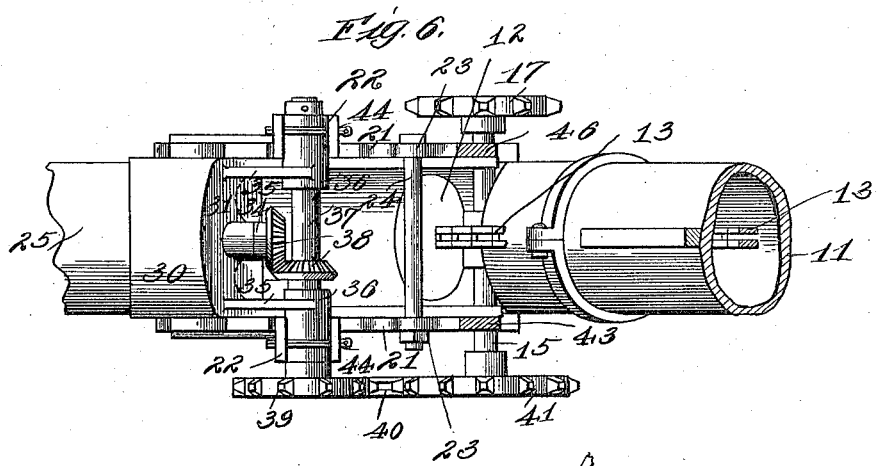
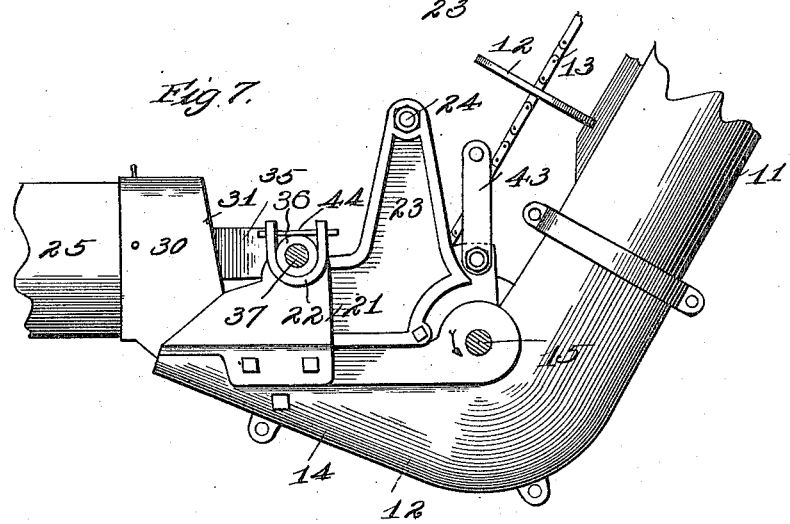
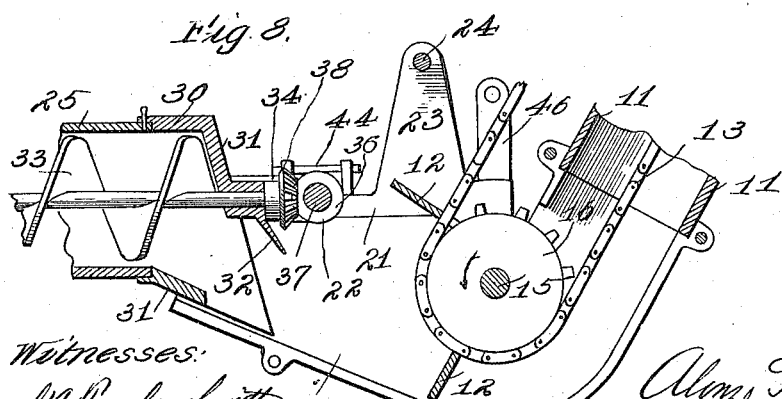

UNITED STATES PATENT OFFICE.

ALONZO T. ADAMS, OF MOLINE, ILLINOIS, ASSIGNOR, BY MESNE ASSIGNMENTS, TO MARSEILLES COMPANY, OF EAST MOLINE, ILLINOIS, A CORPORATION OF ILLINOIS.

ELEVATOR.

1,163,057. Specification of Letters Patent. Patented Dec. 7, 1915.

Application filed August 16, 1910. Serial No. 577,398.

*To all whom it may concern:*

Be it known that I, ALONZO T. ADAMS, a citizen of the United States, residing at Moline, in the county of Rock Island and State of Illinois, have invented certain new and useful Improvements in Elevators, of which the following is a specification, reference being had therein to the accompanying drawing.

My invention relates to elevators for grain, etc., and especially to those parts of the device relating to the association of the cross-conveyer or drag usually employed to receive the material from the wagon and feed it to the elevating mechanism.

The object of the invention is to provide certain new and improved features relating to the elevator and cross-conveyer or drag having a screw-conveyer to discharge by gravity directly into the open end or boot of the elevator and so mounted upon the boot or open end that it may be swung up out of the path of the loaded wagon moving to position to discharge its contents into the drag and then swung down to position in rear of the wagon to receive the material therefrom without disengaging the driving connections.

The invention consists in the novel features hereinafter described and then pointed out in the appended claims.

In the accompanying drawings which illustrate a practical embodiment of my invention: Figure 1 is a view showing in side elevation a device having the features of my present invention with the cross-conveyer or drag in position to receive the material from a wagon shown in position to discharge therein; Fig. 2 is a detail view of parts shown in Fig. 1 with the cross-conveyer or drag swung up to position out of the path of the wagon; Fig. 3 is a top plan view of the cross-conveyer or drag with the inclined sides thereof shown in section; Fig. 4 is a detail view showing the front plate of the drag; Fig. 5 is a detail view showing the rear plate or hood of the drag; Fig. 6 is a detail top plan view of the adjacent ends of the elevator and drag with some parts in section and all shown upon a larger scale than in the preceding figures; Fig. 7 is a side view of the parts of Fig. 6 with the coöperating sprocket drive and other parts omitted and the shafts in section, and Fig. 8 is a longitudinal vertical sectional view of the same parts.

Referring to the drawings, the elevator proper may be of any suitable form and construction but preferably comprises a base 10 in the form of a truck supported upon front and rear wheels, a tubular mast 11 of suitable diameter pivotally mounted upon the truck, and a conveyer comprising an endless series of correspondingly shaped flights 12 moving in the bore of the mast and connected by a suitable drive chain 13, the general arrangement and operation of these parts preferably following those set forth in Patent No. 1,117,619, dated Nov. 17, 1914 based on my companion application filed March 29, 1909, and bearing Serial Number 485,640. The lower end of the mast is provided with an open end or boot 14 which provides bearings for a drive shaft 15 having an interior sprocket 16 for the chain 13 and extending through the boot so that it may be connected at either end with the tumbling-rod (not shown) of a horse power (not shown) or may be driven by an exterior sprocket 17 having a suitable sprocket chain connection 18 from a suitable motor 19 mounted on the base. When the mast is set to the desired inclination the shaft is driven in the direction of the arrows and the flights 12 enter the mouth of the boot and pass down through the grain and up through the mast to deliver the grain or other material to the desired location, it being understood that a suitable delivery spout 20 may be attached to the discharge end of the mast if desired. The boot is provided on each side with an upwardly extending bracket 21 having a seat or bearing 22, preferably open at its top, and a wing 23 located in rear of and extending above the associated bearing to support a stop-rod 24 for a purpose to be presently described.

The grain is discharged into the elevator-boot by a cross-conveyer or drag comprising a metallic body 25 curved in cross section and open at its top for the greater portion of its length and provided adjacent its open top with laterally inclined side-plates or deflectors 26 forming with the body a suitable hopper into which the grain is dumped from the wagon 27. The front end of the drag is provided with a closure plate 28 having a circular portion corresponding to the curvature of the body 25 and lateral flanges 29 to close the ends of the inclined side-deflectors 26. The rear end of the drag is tubular and provided with a discharge hood 30 secured upon it and having its outer end downwardly directed to form an extension as at 31 closing the upper portion of the hood and provided with a grain-discharge opening in its under-side leading into the top of the elevator-boot, and a shield 32.

The lower wall of the boot is forwardly and upwardly inclined to form its inlet-opening or mouth, and as shown in Fig. 8 when the drag is in receiving position the extension 31 projects into or telescopes with the mouth or inlet of the boot so that when the drag is swung up to permit the wagon to be driven to its discharge position the extension does not disengage from the boot or allow a gap to occur between these parts until the drag has been swung approximately to vertical position, and therefore any loose material remaining in the drag will be guided into the boot as the drag is lifted or swung up, avoiding any waste of material. Also, the pivotal and telescopic connection of the boot and drag enables the operator to adjust the angularity of the mast by means of the handle 50 while the machine is in operation without creating any gap between these parts.

The plate 28 and hood 30 are provided with bearings for a grain screw 33 in the form of a spiral conveyer which is free to revolve therein but is held against longitudinal displacement therein by a suitable thrust-bearing or box 34 on the plate 28. The discharge hood 30 is provided with a pair of rearwardly extending arms 35 having collars 36, forming bearings for a cross-shaft 37 free to revolve therein but held against displacement by suitable means, and the collars 36 extend laterally beyond the arms and are rotatably supported in the bearings 22 on the boot; as the collars or bearings 36 may turn about this shaft 37 the entire drag may be turned up about the shaft and upon the bearings 22 to swing it to vertical position as shown in Fig. 2 to allow the wagon to be driven to position to discharge into the drag which then is swung down to its receiving position in rear of the wagon as shown in Fig. 1, the drag resting against the stop-rod 24 when turned up.

The screw-conveyer fits the curved body of the drag and the rear end of its shaft is journaled in and extends through the downturned top wall of the extension 31 of the hood where the cross-shaft 37 and the shaft of the screw 33 are provided with intermeshing miter gears 38, and one end of the cross-shaft is also provided with a sprocket wheel 39 driven by a sprocket chain 40 from a sprocket-wheel 41 on the drive-shaft 15, so that the screw-conveyer of the drag is driven from the drive-shaft 15.

By this organization and arrangement of parts the drag discharges directly by gravity into the top of the elevator-boot, feeding the grain directly upon and in the direction of travel of the conveyer flights 12, and the drag may be swung up out of the path of the wagon as it is driven to position to discharge its load and down in the rear of the wagon to receive the material therefrom, the pivotal connection between the drag and boot allowing this movement without wastage of material and without disconnecting any of the intermediate driving connections. Also, the cross-shaft is thus mounted outside the discharge end of the drag so that the gears 38 are not in the chamber or interior of the drag.

The drive chain 40 passes over a suitable idler 42 mounted on a pivotal arm 43 which may be moved to slacken the chain 40 to allow the latter to be removed from engagement with either of its sprockets, when the drag may then be removed from its bearings 22, the removal of the parts breaking the driving connection with the associated drive shaft and this connection is renewed when these parts are again assembled in place. The open-ends of the bearings 22 may be provided with suitable removable cotter-pins or bolts 44 to hold the parts against accidental displacement. The chain 18 also passes over an idler 45 mounted on a pivotal arm 46.

The mast when not in use rests near its outer end upon the bracket 47 and is swung upon its pivot by any suitable means such for example as the trolley arm 48 pivoted to the base and operated by suitable ropes or cables 49 passing over idlers and winding upon a suitable drum operated by the crank-handle 50. When the mast is out of operative position the drag or cross-conveyer is detached therefrom, and when the mast is set at the necessary inclination, the drag or cross-conveyer then will be assembled with it in operative relation as shown, its outer end being supported by a suitable leg or stand 51 which may be pivoted thereto as at 52 to fold thereon and held in extended position by a detachable brace 53. When the wagon is to be driven to place the drag is swung up to the position shown in Fig. 2 and after the wagon is positioned the drag is swung down to position in its rear as shown in Fig. 1, the stop constituted by the rod 24 being above the pivot point of the drag so that the latter when swung up does not interfere with the conveyer-flights 12. The power shaft 15 being suitably driven moves the screw conveyer 33 to discharge the material received by it from the wagon into the open end or boot of the elevator, the material feeding by gravity directly into the boot in the same general direction as the direction of travel of the flights which then carry it along through the mast to the discharge. The shield 32 protects the gears 38 from the grain and deflects the latter toward the bottom of the boot.

Having described my invention, I claim:

1. An elevator having conveying means and a drive shaft therefor, a boot at the receiving end of the elevator having an opening in its top, bearings on the boot above its opening, a drag having a curved body and a tubular discharge end, a screw-conveyer in the drag having its shaft extending outside the discharge end thereof, an exterior cross-shaft mounted on the discharge end of the drag and supported in the boot-bearings to support the discharge end of the drag in the boot-opening, connections between the cross-shaft and screw, and driving connections between the drive-shaft and cross-shaft.

2. An elevator having conveying means and a drive shaft therefor, a boot at the receiving end of the elevator having an opening in its top, bearings and a stop on the boot above its opening, the stop extending above the bearings, a drag in the plane of the stop having a tubular discharge end and a screw-conveyer, a cross-shaft outside the discharge end of the drag connected to the screw and removably supported in the boot-bearings with the discharge end of the drag in the boot opening, and driving connections between the drive shaft and cross-shaft.

3. An elevator having conveying means and a drive shaft therefor, a boot at the receiving end of the elevator having an opening in its top, bearings on the boot above its opening, a drag having a curved body and a tubular discharge end, a screw conveyer in the drag having its shaft extending through the discharge end thereof, a cross-shaft outside the discharge end of the drag, laterally extending bearings on the drag for the cross-shaft and pivotally and removably supported in the boot-bearings to support the discharge end of the drag in the boot-opening, gear connections between the cross-shaft and screw, and separable driving connections between the drive-shaft and cross-shaft.

4. An elevator having conveying means and a drive shaft therefor, a boot at the receiving end of the elevator having an opening in its top, bearings and a rear stop on the boot adjacent the opening, the stop extending above the bearings, a drag having a tubular discharge end and a screw-conveyer and a cross-shaft mounted outside upon the discharge end of the drag, the cross-shaft being pivotally and removably supported in the boot-bearings with the discharge end of the drag in the boot-opening and resting against the stop when the drag is swung up, gear connections between the cross-shaft and screw, and separable driving connections between the drive-shaft and cross-shaft.

5. An elevator having conveying means and a drive shaft therefor, a boot at the receiving end of the elevator having an opening in its top, open-bearings on the boot above its opening, pins to close the bearings, a drag having a curved body and a tubular discharge end, a downwardly inclined hood on the discharge end of the drag, a screw conveyer in the drag having its shaft projecting through the hood, a cross-shaft mounted outside the discharge end of the drag and connected to the screw, the cross shaft being pivotally and removably supported in the boot-bearings with the mouth of the hood in the boot-opening, and separable driving connections between the drive-shaft and cross-shaft.

6. An elevator having conveying means and a drive shaft therefor, a boot at the receiving end of the elevator having an opening in its top, brackets on the boot each having a front bearing and a rear stop, a drag having a screw-conveyer, a hood at the discharge end of the drag having a downwardly directed outlet in the boot-opening and resting against the stop when the drag is swung up, collars on the hood pivotally supported in the boot-bearings, a cross-shaft in the collars and connected to the screw, and driving connections between the drive-shaft and cross-shaft.

7. An elevator having conveying means and a drive shaft therefor, a boot at the receiving end of the elevator having an opening in its top, bearings on the boot above its opening, a drag pivotally supported in the boot-bearings and having a tubular discharge end with a depending outlet in the boot-opening, a screw conveyer in the drag, a cross-shaft on the outside of the drag and carried in the boot-bearings, gears connecting the cross-shaft and screw, driving connections between the drive-shaft and cross-shaft, and a shield at the drag outlet protecting the gears and deflecting the material toward the bottom of the boot.

8. An elevator having conveying means and a drive shaft therefor, a boot at the receiving end of the elevator having an opening in its top, bearings on the boot above its opening, a drag having a screw-conveyer, a hood at the discharge end of the drag having a downwardly directed outlet in the boot opening, collars on the hood pivotally supported in the boot-bearings and supporting the outlet of the drag in the boot-opening, a cross-shaft in the collars outside of the drag, gear connections between the cross-shaft and screw, and separable driving connections between the drive-shaft and cross-shaft.

9. An elevator having conveying means and a drive shaft therefor, a boot at the receiving end of the elevator having an opening in its top, open-bearings on the boot above its opening, a drag having a screw-conveyer and rearwardly extending arms provided with laterally extending collars pivotally and removably supported in the boot-bearings with the discharge end of the drag above the boot-opening, a cross-shaft in the collars outside the discharge end of the drag and connected to the screw, and driving connections between the drive-shaft and cross-shaft.

10. An elevator having conveying means and a drive shaft therefor, a boot at the receiving end of the elevator having an opening in its top, brackets on the boot each having a front bearing and rear stop, a drag having a screw-conveyer and rearwardly extending arms provided with lateral collars pivotally supported in the boot-bearings with the discharge end of the drag above the boot-opening and resting against the stop when swung up, a cross-shaft in the collars at the discharge end of the drag and connected to the screw, and driving connections between the drive-shaft and cross-shaft.

11. An elevator having conveying means and a drive shaft therefor, a boot at the receiving end of the elevator having an inclined opening it its top, bearings on the boot at the rear of its opening, a drag having a screw conveyer and pivotally supported on the boot-bearings, a hood on the discharge end of the drag and having a downwardly directed extension entering the boot-opening, the shaft of the screw conveyer passing through the extension, a cross-shaft mounted in the rear of the extension, gear connections between the cross-shaft and screw, and driving connections between the drive-shaft and cross-shaft.

In testimony whereof I affix my signature in presence of two witnesses.

ALONZO T. ADAMS.

Witnesses:
C. W. CLAUSER,
W. S. ORICON.

Copies of this patent may be obtained for five cents each, by addressing the "Commissioner of Patents, Washington, D. C."